(12) United States Patent
Shaw et al.

(10) Patent No.: US 10,356,285 B2
(45) Date of Patent: Jul. 16, 2019

(54) SUPPLY COMPONENT COMPRISING CORRECTIVE DATA

(71) Applicants: HEWLETT-PACKARD DEVELOPMENT COMPANY, L.P., Houston, TX (US); PURDUE RESEARCH FOUNDATION, West Lafayette, IN (US)

(72) Inventors: Mark Q. Shaw, Meridian, ID (US); Paul Jeran, Boise, ID (US); Sean Michael Collison, Meridian, ID (US); Terry M. Nelson, Boise, ID (US); Chuohao Tang, Fremont, CA (US); Amy Ruth Reibman, West Lafayette, IN (US); Jan P. Allebach, West Lafayette, IN (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/702,138

(22) Filed: Sep. 12, 2017

(65) Prior Publication Data

US 2018/0013928 A1  Jan. 11, 2018

Related U.S. Application Data

(63) Continuation of application No. PCT/US2016/060877, filed on Nov. 7, 2016.

(30) Foreign Application Priority Data

Jul. 8, 2016 (WO) ................ PCT/US2016/041633

(51) Int. Cl.
*H04N 1/00* (2006.01)
*H04N 1/60* (2006.01)
(Continued)

(52) U.S. Cl.
CPC ............ *H04N 1/6097* (2013.01); *B41J 2/525* (2013.01); *B41J 29/393* (2013.01);
(Continued)

(58) Field of Classification Search
CPC .......................... H04N 1/6019; H04N 1/6097
See application file for complete search history.

(56) References Cited

U.S. PATENT DOCUMENTS 5,644,509 A  7/1997  Schwartz
5,748,176 A  5/1998  Gondek
(Continued)

FOREIGN PATENT DOCUMENTS

CN  103139443 A  6/2013
JP  2003110869 A  4/2003
(Continued)

OTHER PUBLICATIONS

Arnavut, Z et al. Lossless Compression of Color Palette Images with One-dimensional Techniques, Apr.-Jun. 2006. <http://scholarworks.rit.edu/cgi/viewcontent.cgi?article=2049&context=article> (13 pages).
(Continued)

*Primary Examiner* — Scott A Rogers
(74) *Attorney, Agent, or Firm* — Trop Pruner & Hu PC

(57) ABSTRACT

In some examples, a supply component for a printing device includes a memory device comprising a plurality of corrective data to produce a corresponding plurality of color tables each customized for a respective media type of a plurality of media types, wherein a respective corrective data of the plurality of corrective data corresponds to nodes of a reference color table for the printing device that is able to accept the plurality of media types for printing. The respective corrective data includes a plurality of residual values to
(Continued)

transform the nodes of the reference color table to a customized color table for use with a selected media type of the plurality of media types.

21 Claims, 9 Drawing Sheets

(51) Int. Cl.
  *H04N 1/41* (2006.01)
  *H04N 1/23* (2006.01)
  *B41J 2/525* (2006.01)
  *B41J 29/393* (2006.01)

(52) U.S. Cl.
  CPC ....... *H04N 1/00538* (2013.01); *H04N 1/2369* (2013.01); *H04N 1/41* (2013.01); *H04N 1/6019* (2013.01); *H04N 1/6055* (2013.01); *H04N 1/6058* (2013.01); *H04N 2201/0094* (2013.01)

(56) References Cited

U.S. PATENT DOCUMENTS

| | | | |
|---|---|---|---|
| 5,751,434 | A | 5/1998 | Narendranath et al. |
| 5,930,553 | A | 7/1999 | Hirst et al. |
| 5,982,990 | A | 11/1999 | Gondek |
| 6,313,925 | B1 | 11/2001 | Decker et al. |
| 6,327,383 | B2 | 12/2001 | Todoroki |
| 6,804,025 | B1 | 10/2004 | Ueda et al. |
| 6,816,179 | B2 | 11/2004 | Hanyu |
| 7,221,473 | B2 | 5/2007 | Jeran |
| 7,259,890 | B2 | 8/2007 | Jeran |
| 7,633,658 | B2 | 12/2009 | Tsuji |
| 7,663,781 | B2 | 2/2010 | Song et al. |
| 7,796,296 | B2 | 9/2010 | Martinez et al. |
| 7,826,111 | B2 | 11/2010 | Won et al. |
| 8,203,758 | B2 | 6/2012 | Itagaki |
| 8,274,696 | B2 | 9/2012 | Yoneda |
| 8,526,062 | B2 | 9/2013 | Klassen |
| 8,740,343 | B2 | 6/2014 | Kawai |
| 8,797,616 | B2 | 8/2014 | Sugiura et al. |
| 8,885,216 | B2 | 11/2014 | Ishitoya et al. |
| 9,111,204 | B2 | 8/2015 | Fujita et al. |
| 9,621,764 | B2 | 4/2017 | Gondek |
| 9,796,186 | B1* | 10/2017 | Nichols .............. G06K 15/1868 |
| 9,800,765 | B2* | 10/2017 | Gondek ............... B41J 2/17546 |
| 9,819,835 | B2* | 11/2017 | Nichols .............. G06K 15/1868 |
| 9,992,382 | B2* | 6/2018 | Hu ....................... B41J 2/17546 |
| 10,165,154 | B2 | 12/2018 | Hu |
| 2002/0126301 | A1* | 9/2002 | Bowers ................ B41J 2/17546 358/1.9 |
| 2002/0149785 | A1 | 10/2002 | Chu et al. |
| 2003/0016259 | A1* | 1/2003 | Otokita .................. B41J 11/009 347/14 |
| 2003/0025939 | A1 | 2/2003 | Jeran |
| 2003/0214686 | A1* | 11/2003 | Saito .................... H04N 1/6019 358/504 |
| 2004/0136016 | A1* | 7/2004 | Oshikawa .......... H04N 1/00233 358/1.9 |
| 2004/0233484 | A1* | 11/2004 | Seko .................... H04N 1/6019 358/523 |
| 2005/0073731 | A1 | 4/2005 | Deer et al. |
| 2006/0187252 | A1* | 8/2006 | Deer ........................ H04N 1/54 347/15 |
| 2007/0081205 | A1 | 4/2007 | Tai et al. |
| 2007/0115506 | A1 | 5/2007 | Yada |
| 2007/0195342 | A1 | 8/2007 | Sugiura et al. |
| 2007/0291287 | A1 | 12/2007 | Snyder et al. |
| 2008/0037046 | A1* | 2/2008 | Nishikawa ........... H04N 1/6019 358/1.9 |
| 2010/0053650 | A1* | 3/2010 | Yamamoto ............. H04N 1/603 358/1.9 |
| 2010/0085605 | A1 | 4/2010 | Shaw et al. |
| 2010/0157331 | A1 | 6/2010 | Shestak |
| 2010/0157339 | A1* | 6/2010 | Yamada ............. H04N 1/00002 358/1.9 |
| 2010/0220926 | A1 | 9/2010 | Monga et al. |
| 2010/0296114 | A1 | 11/2010 | Jung et al. |
| 2012/0218574 | A1* | 8/2012 | Fukuda ................ H04N 1/6033 358/1.9 |
| 2014/0098387 | A1 | 4/2014 | Chang |
| 2015/0103902 | A1 | 4/2015 | Li et al. |
| 2016/0112606 | A1 | 4/2016 | Gondek et al. |
| 2016/0303878 | A1* | 10/2016 | Andrea Tallada ... H04N 1/6097 |
| 2017/0225475 | A1* | 8/2017 | Nichols ................ B41J 2/17543 |
| 2018/0013929 | A1* | 1/2018 | Tang .................... B41J 2/17546 |
| 2018/0111385 | A1* | 4/2018 | Shimomukai ............. B41J 2/21 |

FOREIGN PATENT DOCUMENTS

| | | |
|---|---|---|
| TW | 201505861 A | 2/2015 |
| WO | WO-2006081253 | 8/2006 |
| WO | WO-2015016860 | 2/2015 |
| WO | WO-2015042432 | 3/2015 |
| WO | WO-2016028272 | 2/2016 |
| WO | WO-2016186625 | 11/2016 |

OTHER PUBLICATIONS

Balaji et al., Hierarchical Compression of Color Look Up Tables, 15th Color imaging Conference Final Program and Proceedings, 2008 (6 pages).

Balaji et al., Preprocessing Methods for Improved Lossless Compression of Color Look-up Tables, Journal of Imaging Science and Technology, 2008 (9 pages).

Boon-Lock Yeo and Bede Liu, Volume rendering of DCT-based compressed 3D scalar data. IEEE Transactions on Visualization and Computer Graphics, 1(1):29-43, Mar. 1995 (15 pages).

Canon Imagepress Server Color Management Guide, 2009, < http://www.techsupport.cusa.canon.com/pf/MHPContent/imagepress/iPress-Server-Color-Guide.pdf > (31 pages).

Chuohao Tang et al., U.S. Appl. No. 15/611,462 entitled Color Table Compression filed Jun. 1, 2017 (33 pages).

De Queiroz et al., On Independent Color Space Transformations for the Compression of CMYK Images; IEEE Transactions on Image Processing, vol. 8, No. 10, Oct. 1999 (6 pages).

Deutsch, Network Working Group, Request for Comments: 1952, Category: Informational, GZIP file format specification version 4.3, May 1996 (19 pages).

European Patent Office, Communication—European Search Report for Appl. No. 17180591.4 dated Nov. 27, 2017 (4 pages).

European Patent Office, Communication pursuant to Article 94(3) EPC for App. No. 17179824.2 dated Dec. 20, 2017 (5 pages).

European Patent Office, International Search Report and Written Opinion for PCT/US2016/041633 dated Mar. 20, 2017 (19 pages).

European Patent Office, International Search Report and Written Opinion for PCT/US2016/060873 dated Mar. 20, 2017 (16 pages).

European Patent Office, International Search Report and Written Opinion for PCT/US2016/060874 dated Mar. 14, 2017 (16 pages).

European Patent Office, International Search Report and Written Opinion for PCT/US2016/060675 dated Mar. 14, 2017 (18 pages).

European Patent Office, International Search Report and Written Opinion for PCT/US2016/060876 dated Mar. 9, 2017 (14 pages).

European Patent Office, International Search Report and Written Opinion for PCT/US2016/060877 dated Mar. 10, 2017 (17 pages).

Hewlett-Packard Development Company L.P., International Application No. PCT/US2016/060875 entitled Printing Device Supply Component filed Nov. 7, 2016 (42 pages).

Hewlett-Packard Development Company L.P., International Application No. PCT/US2016/060876 entitled Printing Device Supply Component filed Nov. 7, 2016 (38 pages).

Hewlett-Packard Development Company, L.P., International Appl. No. PCT/US2016/041633 entitled Color Table Compression filed Jul. 8, 2016 (29 pages).

ICC Profiles dated on or before Jun. 26, 2016 (2 pages).

(56) References Cited

OTHER PUBLICATIONS

International Color Consortium, Specification, ICC.1:2010 (Profile version 4.3.0.0) Image technology colour management—Architecture, profile format, and data structure [Revision of ICC. 1:2004-10], 2010 (130 pages).
Kim, Low Bit-Rate, Scalable Video Coding with 3D Set Petitioning in Hierarchical Trees (3D SPIHT), date unknown (34 pages).
Lexmark.com—Color Quality Guide, Oct. 17, 2007, < http://publications.lexmark.com/publications/pdfs/2007/cx310/cx310_hmp/en/color-quality-guide.pdf > (5 pages).
Lou—Abstract Only—The development of the CIE 2000 colour-difference formula: CIEDE2000, Aug. 2001 (4 pages).
Luo et al., Uniform Colour Spaces Based on CIECAM02 Colour Appearance Model, 2006 (11 pages).
LZMA-SDK (Software Development Kit) dated on or before Jan. 7, 2009 (2 pages).
Monga, V. et al, "Design and Optimization of Color Lookup Tables on a Simplex Topology", Apr. 2012, pp. 1981-1996.
Robertson, Color Research & Application—Abstract Only, 1977 (4 pages).
Said, A New Fast and Efficient Image Codec Based on Set Partitioning in Hierarchical Trees, IEEE, May 1993 (16 pages).
Shapiro, Embeeded Image Coding Using Zerotrees of Wavelet Coefficients, IEEE, Dec. 1993 (18 pages).
Sudhakar, Image Compression using Coding of Wavelet Coefficients—A Survey, Jun. 2005 (14 pages).
Tang, ICC Profile Color Table Compression, Nov. 7, 2016 (6 pages).
Tang, Three-Dimensional Wavelet-Based Compression of Hyperspectral Images, 2006 (36 pages).
U.S. Appl. No. 15/611,462, Final Rejection dated Dec. 1, 2017, pp. 1-20 and attachments.
U.S. Appl. No. 15/611,462, Non-Final Rejection dated Jul. 28, 2017, pp. 1-13 and attachment.
U.S. Appl. No. 15/642,929, Non-Final Rejection dated Sep. 1, 2017, (5 pages).
Watson, Image Compression Using the Discrete Cosine Transform, 1994 (17 pages).
Zhenhua Hu et al., U.S. Appl. No. 15/642,929 entitled Color Table Compression filed Jul. 6, 2017 (29 pages).
Office Actions of File History of U.S. Appl. No. 15/986,915, dated Sep. 13, 2019, Nov. 28, 2018, and Jul. 6, 2018 (42 pages).
U.S. Appl. No. 15/611,462, Examiner's Answer dated May 30, 2018 (25 pages).
U.S. Appl. No. 15/970,338, Non-Final Rejection dated Jun. 7, 2018, pp. 1-4 and attachments.

* cited by examiner

SUPPLY COMPONENT COMPRISING CORRECTIVE DATA

CROSS REFERENCE TO RELATED APPLICATIONS

This is a continuation of International Application No. PCT/US2016/060877, filed Nov. 7, 2016, which claims priority from International Application No. PCT/US2016/041633, filed Jul. 8, 2016, which are both hereby incorporated by reference in their entirety.

BACKGROUND

Printing devices—including printers, copiers, fax machines, multifunction devices including additional scanning, copying, and finishing functions, all-in-one devices, or other devices such as pad printers to print images on three dimensional objects and three-dimensional printers (additive manufacturing devices)—employ color management systems to deliver a controlled conversion between color representations of various devices, such as image scanner, digital camera, computer monitors, printers, and software applications. Device profiles provide color management systems with information to convert color data between color spaces such as between native device color spaces and device-independent color spaces, between device-independent color spaces and native device color spaces, and between source device color spaces and directly to target device color spaces.

DETAILED DESCRIPTION

Figure 1:
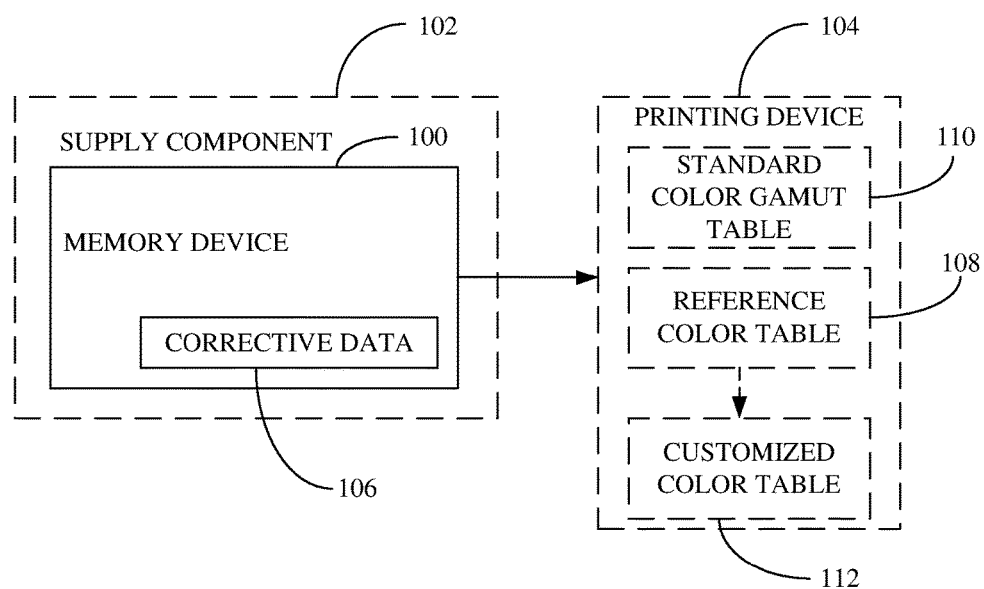
FIG. 1 is a block diagram illustrating an example memory device having a corrective data for transforming a reference color table into a customized color table.

A color space is a system having axes and that describes color numerically. Some output devices, such as printing devices, may employ a type of four color cyan-magenta-yellow-key (black) (CMYK) color space, while some software applications and display devices may employ a type of three color red-green-blue (RGB) color space. For example, a color represented in the CMYK color space has a cyan value, a magenta value, a yellow value, and a key value that combined numerically represent the color. Additionally, some software devices may employ a monochromatic or gray scale color space.

Color tables that provide transformations between various color spaces are extensively used in color management, common examples being the transformations from device independent color spaces (such as CIELAB, i.e., L*a*b*) to device dependent color spaces (such as RGB or CMYK) and vice versa. The mappings may be specified using tables such as one or more single or multidimensional lookup tables, to which interpolation can be applied, or through a series of parameters for transformations. A color table can include an array or other data structure on a memory device that replaces runtime computations with a simpler array indexing operation as a color lookup table. For the purposes of this disclosure, color tables can also include monochromatic and gray scale color tables.

For example, a color table can include a set of M nodes that may accommodate M colors from a range of total colors. Each node includes a particular color value represented as a set of bits or bytes. A color table of 256 colors in the RGB color space may be represented with 256 nodes with each node having a depth of 18 bits, i.e., six bits for each value of red, green, and blue.

A color profile is a set of data that characterizes a color space. In one example, a color profile can describe the color attributes of a particular device or viewing specifications with a mapping between the device-dependent color space, such as a source or target color space, and a device-independent color space, such as profile connection space (PCS), and vice versa. The mappings may be specified using color tables. Devices and software programs—including printers, monitors, televisions, operating systems, browsers, and other device and software—that capture or display color can include profiles that comprise various combinations of hardware and programming.

An ICC profile is an example color profile that is a set of data that characterizes a color space according to standards promulgated by the International Color Consortium (ICC). The ICC profile framework has been used as a standard to communicate and interchange between various color spaces. An ICC output profile includes color table pairs, so-called A2B and B2A color look up tables, where A and B denote the device-dependent and the device-independent color spaces, respectively. For different devices, there are different look up table rendering intent pairs. For example, an ICC profile allows for three color table pairs, enumerated from 0 to 2, enabling the user to choose from one of the three possible rendering intents: perceptual, colorimetric, or saturation. ICC profiles are often embedded in color documents as various combinations of hardware and programming to achieve color fidelity between different devices, which increases the total size of these documents. The size of color tables will also increase with finer sampling of the spaces and larger bit depths.

In general, a profile can include N color tables to be processed, such as $CLUT_1, CLUT_2, \ldots, CLUT_N$. Multiple color tables representing different rendering intents are often included with one ICC profile. Further, the input color space includes $J_{in}$ channels and the output color space includes $J_{out}$ channels, and in many examples of an ICC profile $J_{in}$ and $J_{out}$ can be one or more channels. For each output channel, the corresponding lookup table contains $M^{J_{in}}$ nodes.

For printing devices such as color printers, the color tables are often embedded in the printer firmware or other hardware, where the color tables consume computer memory in storage devices. In some scenarios, the amount of firmware memory consumed for storing these color tables can become a concern, particularly as the number of the look up tables in color devices increases to support multiple color spaces, print media, and preferences. The trend toward finer sampling of the spaces and larger bit depths also results in an increase in table sizes, further exacerbating these memory concerns. Additionally, the concerns of efficient memory use and storage space consumption are applicable for color tables that are embedded in color documents such as ICC source profiles. In applications where embedded profiles are used, the embedded profiles represent an overhead.

During mass manufacture of printing devices, standard color tables are included in firmware for general applicability to a general user. Customization is performed via firmware updates, which can be tedious as well as consuming additional memory, or at times supplanting standard color tables thus leading to additional expense, overhead, or reduced functionality.

As used herein, a printing device supply component may corresponding to a component from which consumable printing material may be supplied to a printing device for use thereof. Some examples of a printing device supply component may be referred to as a print cartridge, where a print cartridge may be replaceable and may be a two dimensional or three dimensional print cartridge. Examples of printing device supply components and print cartridges may comprise a print material reservoir to store a reserve of print material for use in printing operations when replaceably coupled to a printing device/system. Examples of print material, as used herein, may include consumable materials such as consumable fluids and/or consumable powders. Examples of print material include ink, toner, gloss, varnish, powders, sealants, colorants, and/or other such materials for printing. For example, a print cartridge may include fluid ink corresponding to at least one color (or two or more colors) in which a printing device may print. In other examples, a print cartridge may include toner corresponding to at least one color (or two or more colors) in which a printing device may print. In some examples, such supply components and print cartridges thereof may be referred to as "replaceable supplies."

FIG. 1 illustrates an example, memory device 100 for a supply component 102 for use with a printing device 104. An example of a supply component is a consumable, or a replaceable element on the printing device 104, such as an ink cartridge, toner cartridge, or piece of a print engine. The memory device 100 includes corrective data 106 corresponding with nodes of a reference color table 108 for the printing device 104. In one example, the reference color table 108 is stored in the firmware or hardware of the printing device 104. The printing device 104 can accept a plurality of media types for printing, such as plain paper, glossy paper, overhead transparencies, and other example media. The corrective data 106 includes a plurality of residual values to transform the nodes of the reference color table 108 to a customized color table 110 for use with a selected media type of the plurality of media types. The supply component 102 may include corrective data 106 to transform the reference color table 108 to one or more of customized color table corresponding with one or more media types 110.

The example memory device 100 can be implemented to include a combination of one or more volatile or nonvolatile computer storage media. Computer storage media may be implemented as any suitable method or technology for storage of information such as computer readable instructions, data structures, program modules or other data. A propagating signal by itself does not qualify as storage media or a memory device. The memory device 100 can be included as part of a system including a processor and memory for storing a set of computer instruction for controlling the processor to apply the corrective data 106 transform the reference color table 108 to a customized color table 110.

Figure 2:
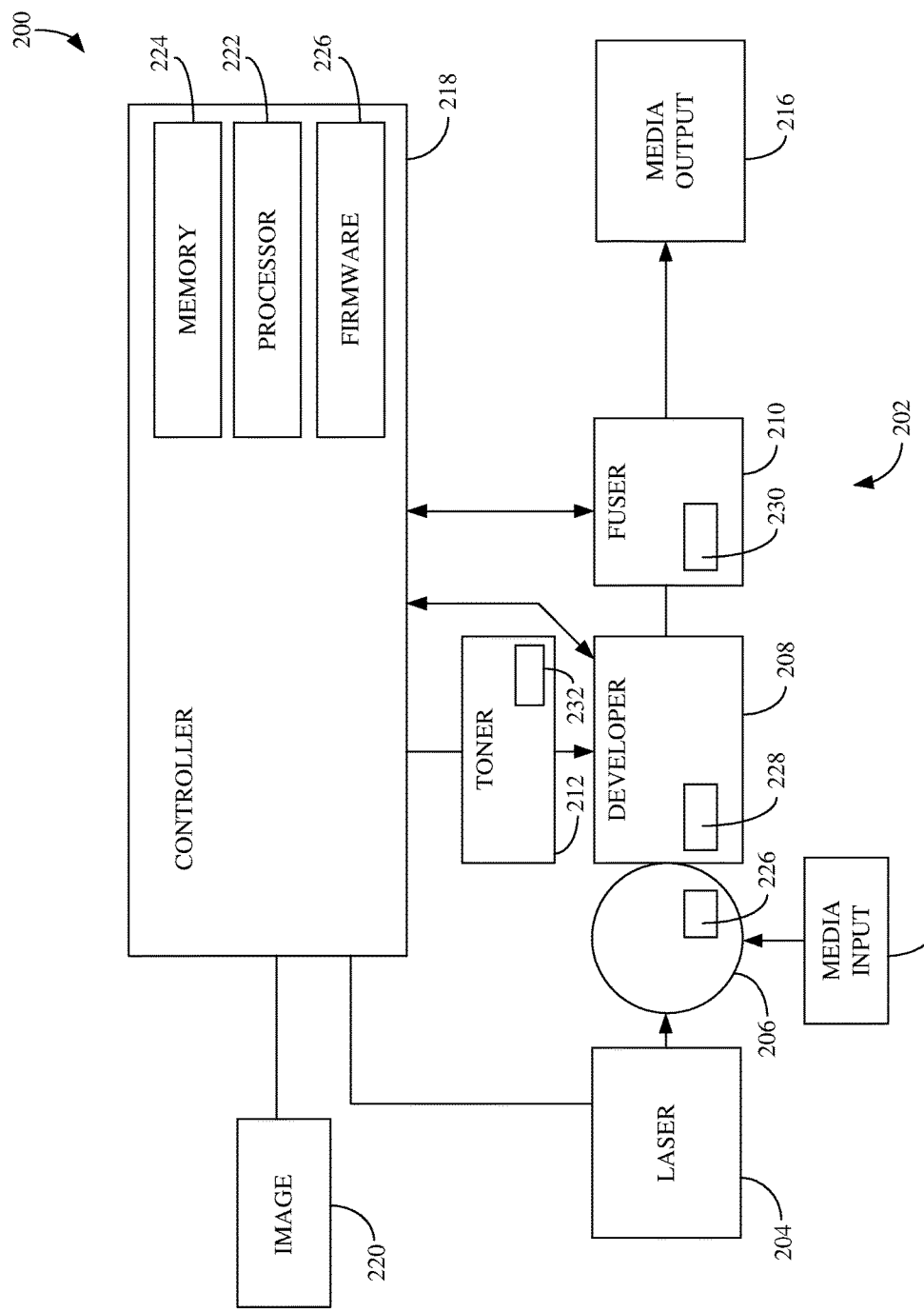
FIG. 2 is a schematic diagram illustrating an example printing device for receiving the memory device of FIG. 1.

FIG. 2 illustrates an example printing device 200, which can correspond with printing device 104, to receive digital images or digital models and produce objects or images on media such as paper, polymeric materials, and other media. Printing device 200 includes a print engine 202 that includes mechanisms and logic to print or mark images onto the media. An example of print engine 202 can include components such as a laser 204, a photoreceptor that can include a rotating photoconductive drum 206, a developer 208, and a fuser 210, and can accept one or more cartridges 212 of ink in the form of toner, or powdered ink, or other printing or marking material. The print engine 202 can receive media for printing at a media input 214 and present the media having a printed image at a media output 216 of the printing device 200. Controller 218 can control the operation of the printing device 200.

Supply components of the printing device 200 can include consumable elements that can be selectively replaced after a period of time or at the discretion of the user. Example supply components or consumable elements of the print engine 202 include the drum 206, developer 208, the fuser 210, and other elements. The ink cartridge 212, which may included a relatively limited life span as compared to components of the print engine 202, is also selectively replaceable when empty or if the user desires a different formulation of toner and is an example of a supply component. Each of these components includes features and parameters that can affect the performance of the printing device including the application of the image to the media, and may affect the application of the controller 218. Print engine 202 in the example is a laser print engine for illustration, although printing device can include other printing or marking engines such as LED print engines, inkjet print engines, and others, and the features of this disclosures can be applicable to other print engines as well as well as supply components of other printing devices or print engines using printing and marking materials.

Controller 218 can include one or more processors 222 and memory 224. The memory 224 can store instructions and data that can be executed and applied by processor 222 to perform one or more methods for controlling the printing device 200. In one example, the instructions can be in the form of firmware 226 stored on the printing device 200 and accessible by the controller 218. Controller 218 can be a centralized control device in printing device 200, such as centralized memory and processor operating a software or firmware application, or parts of the controller 218 can be distributed on one or more components of the print engine 202.

Cartridges 212 can include a cartridge of cyan colored ink, magenta colored ink, yellow colored ink, and black ink. In another example, separate containers of different colors of ink may be combined in a single cartridge. Media types may include plain paper, heavy paper, card stock, photo paper (glossy and matte), overhead transparencies, and other forms of media.

Print engine 202 of the example performs an electrostatic digital printing process to produces text, graphics, and photographs by repeatedly passing a laser beam back and forth over a negatively-charged, photoconductive drum 206 to define a differentially-charged latent image on the drum 206. In the example, laser 204, produces a laser beam to project a latent image of the intended text, graphics, or photographs to be applied onto an electrically charged, rotating, photoconductive drum 206. Photoconductivity allows the charged electrons on the drum 206 to fall away from the areas exposed to the laser beam from laser 204.

In one example, the laser 204 can include an aluminum gallium arsenide (AlGaAs) semiconductor laser, and the photoconductive drum 206 can include an organic photoconductive surface including an organic photoconductor, and can be constructed from an organic monomer such as N-vinylcarbazole or can include a coating of selenium. The photoconductive surface of the drum 206 can be charged via primary charge mechanism in contact or proximity to the photoconductive surface.

Particles of toner from cartridge 212 are electrostatically attracted to the areas of the drum 206 that have been imaged by the laser beam. The drum 206 transfers the toner onto the media, which is received from media input 214 and passed through the printing engine 202, by direct contact. Print engine 202 passes with media with the toner to fuser 210, which uses intense heat and pressure to instantly fuse the toner onto the media. The print engine 202 then passes the media toward media output 216.

The printing device 200 receives the image to be printed as a digital file 220 to be stored in memory 224. The image to be printed can be encoded in, for example, a page description language such as PostScript, Printer Command Language (PCL), or Open XML Paper Specification (OpenXPS). The printing device can include a raster image processor as part of controller 218 or separately to convert the page description into a bitmap that can be stored in a raster memory on the printing device 200. In a color printer, each of the four colors layers can be stored as a separate bitmap, and all four layers are typically preprocessed before printing. The bitmap is provided to the laser 204.

In one particular example, the printing device 200 will negatively charge the toner in the cartridge 212. Toner can include fine particles of dry plastic powder mixed with carbon black or coloring agents. Toner emerges from the cartridge 212 onto the developer 208. The developer 208 can include a developer roll that is coated with a thin layer of toner and is pressed against the photoconductive surface of the drum 206.

Areas of the photoconductive drum 206 that were struck by the laser beam, i.e., the latent image on the surface of the drum 206, can momentarily have no charge, and attract the negatively charged toner particles from the developer 208. The areas of the drum 206 not struck by the laser beam will repel negatively charged toner particles from the developer 208.

Media is then applied against the drum 206, which has been coated with a pattern of toner particles in the places where it was just struck by the laser beam. The toner particles have a relatively weak attraction to the media but even less of an attraction to the drum 206 such that the toner is transferred to from the drum 206 to the media. The media can pass through rollers in the fuser 210, where relatively high temperatures and pressures are used to bond the toner to the media. In one example, the fuser 210 can include a heated roller, formed a hollow tube having an internal heating element, up against a pressure roller, which can include a compliant surface.

Once the laser beam generates a latent image on the photoconductive drum 206, in one example, the remaining features of the printing process can occur in rapid succession. The drum 206 is charged, rotates a few degrees and is scanned with the laser beam, rotates a few more degrees and is developed, and so forth. The printing process can be completed before the drum 206 completes one revolution.

Certain parameters and features of the components of print engine 202 and cartridges 212 can be stored on memory devices distributed with the consumable elements. For example, the drum 206 can include a memory device 226, the developer can include a memory device 228, the fuser 210 can include a memory device 230, and each cartridge 212 can include a memory device 232 that can be read and processed by the controller 218 to operate the printing device 200. Memory devices 226, 228, 230, 232 can be operably coupled to the controller 218 in which the controller can read and process data stored on the memory devices 226, 228, 230, 232, and apply the data to software or firmware to operate the printing device 200. In one example, one or more memory devices 226, 228, 230, 232 can include data relative or applicable to color management systems and color tables applied by the controller 218, such as color table deltas or compressed color tables.

Figure 3:
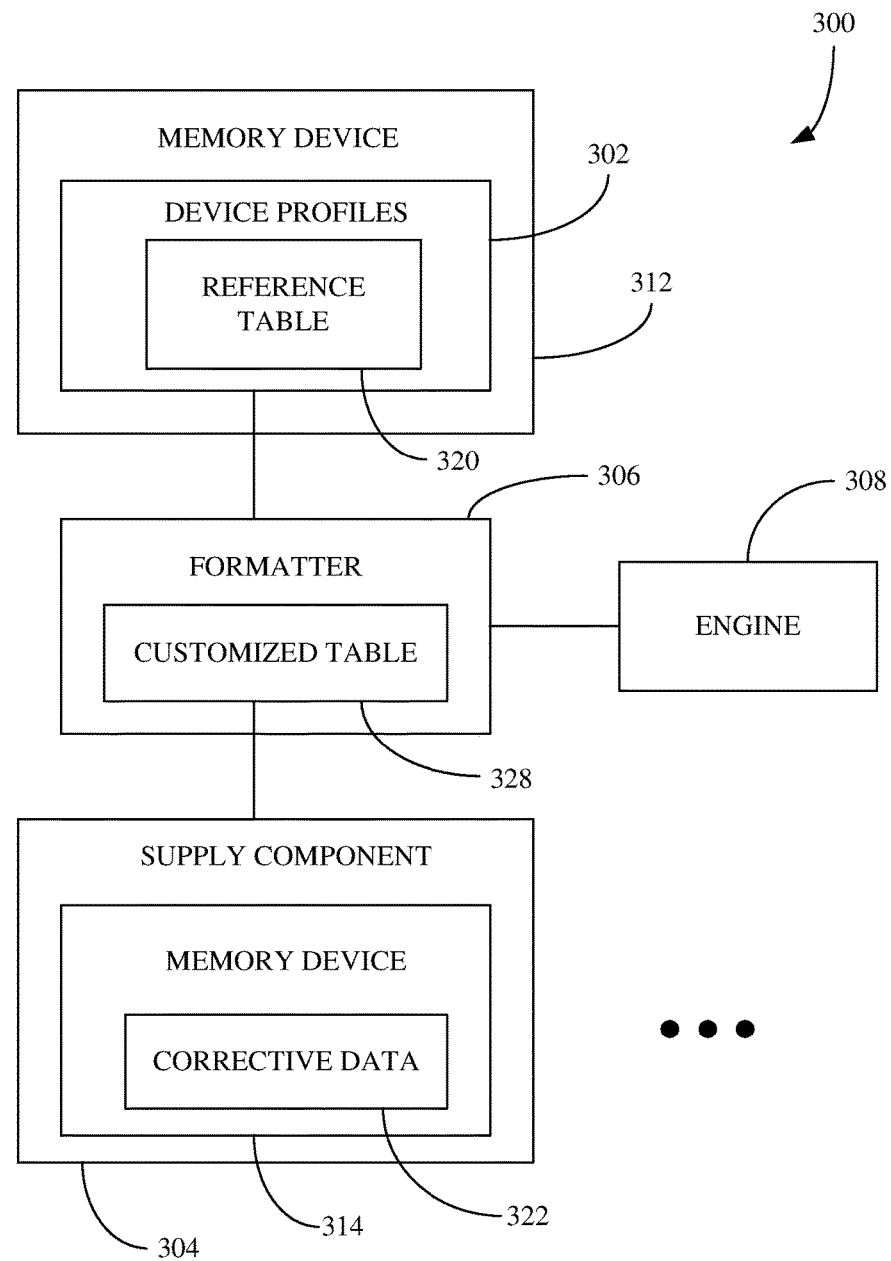
FIG. 3 is a block diagram illustrating an example system for implementing features of the memory device of FIG. 1.

FIG. 3 illustrates an example system 300 implementing the color management features of printing device 200. In one example, system 300 includes a device profile 302 stored on a first memory device 312 and one or more supply components 304, having memory devices 314, coupled to a formatter 306, which can be included as part of firmware 226, that is coupled to an engine 308, such as print engine 202.

Device profile 302 stored on memory device 312 can include device-specific data files that represent color or imaging characteristics of the printing device 200. Examples of memory device 312 can include memory 224. The device profile 302 can include data to convert between device dependent or device independent values of an image file to printing device 200 dependent values to be interpreted by the controller 218 when operating print engine 202 to print an image on media. The device profile 302 can include data files such as reference color table 320, which can correspond with reference color table 108.

Reference color table 320 can include one or more one-dimensional look up reference tables and one or more multidimensional look up reference tables relating to various aspects of the color management system. Reference color table 320 can include a set of nodes having a preselected or predetermined value. In one example, the values of the nodes of the reference table 320 are representative of nodes of an original lookup color table, such as a standard color look up table that may be generally applicable to the printing process. In another example, the values of the nodes of the reference table 320 are selected because they can easily be modified by the corrective data 326 in the supply component 304 and would not be implemented as color tables without modifying information from the supply component 304.

The supply components 304 can include corrective data 326 in the form of digital files on a memory device, such as memory device 314, which can correspond with corrective data 106 on memory device 100. Examples of memory device 314 on supply components 304 can include memory devices 226, 228, 230, 232. In another example, supply modules 304 can be coupled to the formatter 306 via a data network such as the internet. Memory devices 226, 228, 230, 232 can include data that, when activated with printing device 200, can cause supply modules to provide the customization information to the formatter 306. By locating the corrective data 326 on the supply components, changes in formulation or manufacture specifications can be accommodated without having to change firmware on entire fleet of devices. Corrective data 326, in one example, consumes less memory than the reference table or the customized color table, and thus creates less overhead for the supply component.

In one example, a supply component can include corrective data or customization information related to a customized color table to provide cost per page savings, such as a customized color table to reduce use of toner. The same or a different supply component can include corrective data or customization information related to a customized color table for one or more media types. Further, the same or a different supply component can include corrective data or customized information related to a customized color table having a user-selected customized color gamut.

In some examples, such as if there is insufficient memory space available on memory device 314 on the supply component 304, or in limited use customization circumstances, such as for generating customized color tables for rare media types like overhead transparencies, the corrective data 326 can be stored in the first memory device 312.

Formatter 306 can receive corrective data 326 to transform the reference table 320 to a customized color table 328. In one example, the formatter can be included firmware 226 that is configured to be executed with the processor 222 in the controller 218. The generated customized color table 328 can be later stored in memory 224, and included as part of the device profile 302 and provided to controller 218 to operate the engine 308. The device profile 302 can include various A2B reference tables, such as device-to-PCS lookup tables related to perceptual intent, relative colorimetric intent, and saturation intent as a color profile created with the formatter 306 or otherwise stored in memory. The device profile 302 can also include various B2A reference tables, such as PCS-to-device reference tables also related to perceptual intent, relative colorimetric intent, and saturation intent in the color profile also created with the formatter 306 or otherwise stored in memory.

Figure 4:
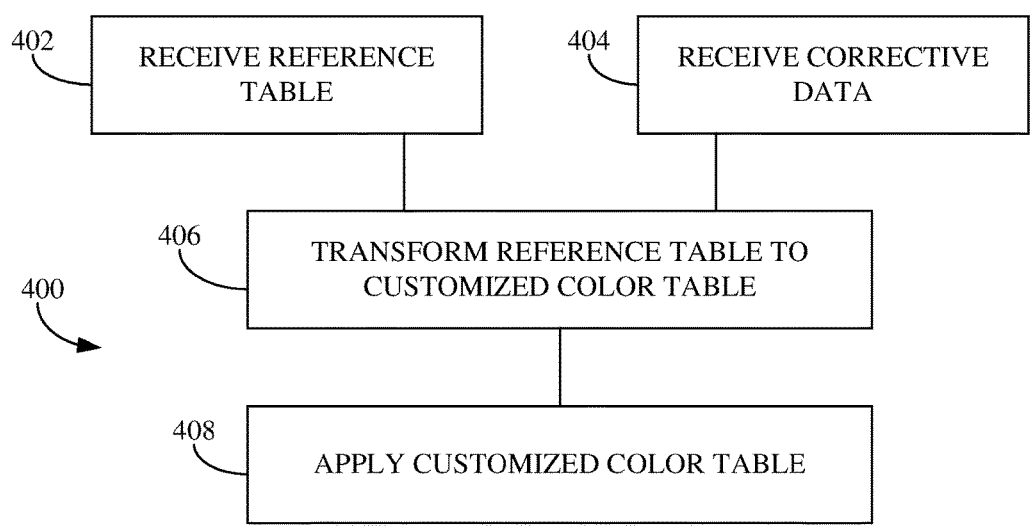
FIG. 4 is a block diagram illustrating an example method transforming the reference table to the customized color table with the corrective data of the example system of FIG. 3.

FIG. 4 illustrates an example method 400 of system 300. Method 400 can be executed, for example, as part of a firmware modification, installation of one or more supply components, such as replacing the ink cartridge, responding to a user-selected mode, such as cost saving mode, or media input, or based on some other prompt. The formatter 306 receives the reference table 320 to be transformed at 402. In one example, the reference color table can include the base values a device-to-device conversion, such as a three-color device (CMY or RGB) to a four-color device (CMYK) such as printing device 200. The formatter 306 also receives the corrective data 326 from the memory device, such as memory device 314, at 404. In connection with this, the formatter may determine whether the corrective data 326 is different from prior to the execution of method 400 in order to avoid having to reinstall the previous customized color table. If the corrective data 326 has changed, the formatter 306 will apply the corrective data 326 to the reference color table 320 to transform the reference color table 320 into a customized color table 328 at 406.

In some examples, one or both of the reference table 320 and the corrective data 326 may be stored on the respective memory devices 312, 314 as compressed data files. In receiving the reference color table 320 at 402 and the corrective data 326 at 404, the formatter may decompress or reconstruct the compressed data files prior to applying the corrective data 326 to the reference color table 320. The customized color table 328 will be loaded into the system 300, such as in device profile 302, to be applied by the printing device 200 at 408.

The example method 400 can be implemented to include a combination of one or more hardware devices and programs for controlling a system, such as controller 218, to perform method 400 to apply corrective data to transform a reference color table to a customized color table. For example method 400 can be implemented as a set of executable instructions in firmware 226 for controlling the processor 224. Other methods of the disclosure can be implemented as a combination of hardware and programming for controlling a system as well.

In one example of method 400, corrective data 326, the memory device 314 can include a bitstream of M residual values stored in memory device 314, and the reference table 320 can include M nodes each having a predetermined value and stored in a data structure on memory device 312. In an example where the transformation seeks to modify less than M of the nodes, the residual values corresponding with the unmodified nodes can be set to zero. In one example of transformation 406, a residual value of the corrective data 326 is added to the value of the corresponding node in the reference table 320 to provide a value at the corresponding node in the customized color table 328. Thus, the residual value at location j of the corrective data is added to the value at node location j of the reference table 320 to provide the value at node location j of the customized color table 328, in which j is the location from 1 to M.

Figure 5A:
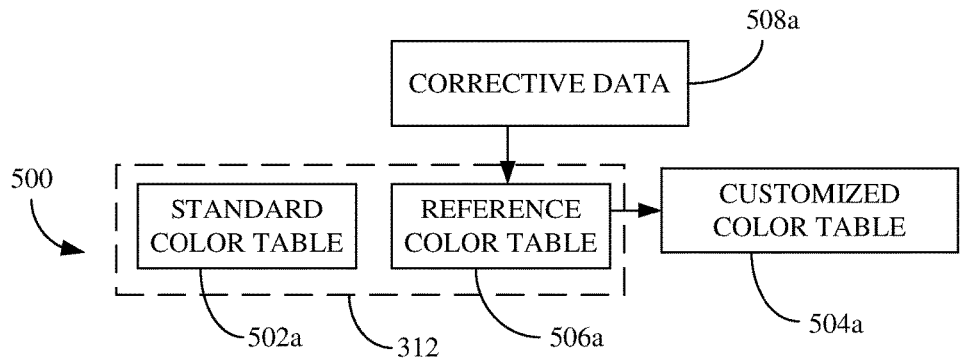
FIG. 5A-5C are block diagrams illustrating example implementations of features of the system of FIG. 3.
Figure 5B:
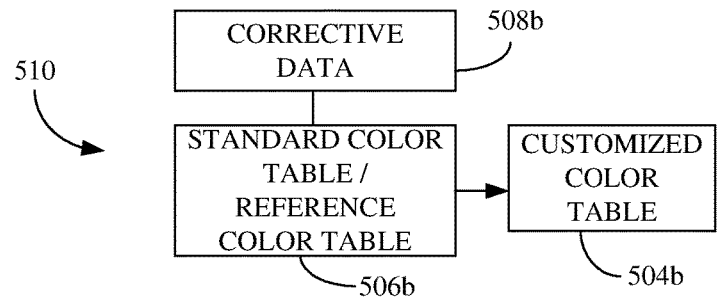
Figure 5C:
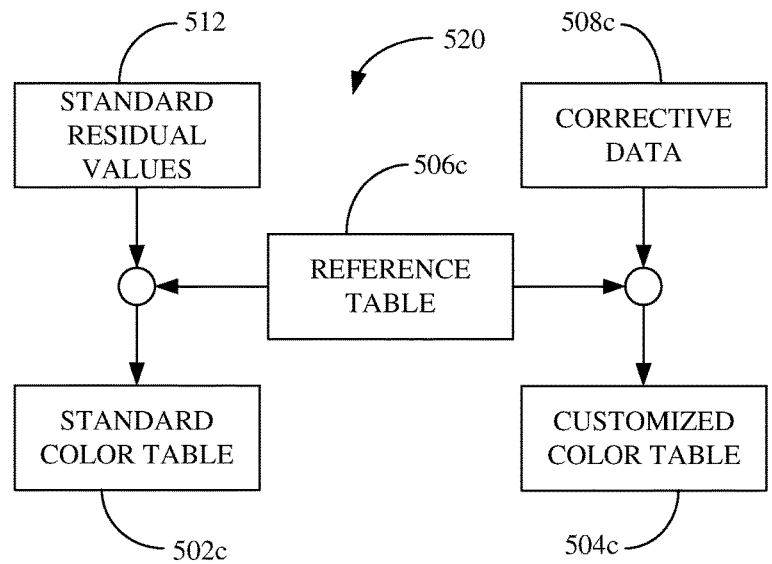

FIGS. 5A-5C illustrate example implementations of systems 500, 510, 520 having standard color tables (502) and customized color tables (504) using system 300 executing method 400 with reference color tables and corrective data. Systems 500, 510, 520 can include standard color tables and customized color tables, such as part of device profile 302 on memory device 312. Standard color tables can be configured having nodes as part of mass manufacture and included for general applicability to a general user. In one example, the standard color table 502 is generally applied to all or many media types at media input 214 whereas the customized color table 504 is applied to the specific media in media input. Additionally, standard color tables can be included as a default color table to be used in case the customized color table cannot be created, such as if the pertinent supply component installed is missing corrective data or if the corrective data is corrupted.

FIG. 5A illustrates system 500 in which a standard color table 502a and a reference color table 506a are provided on a memory device such as memory device 312. Corrective data 508a is provided, such as via a memory device on supply component, for example, on memory device 314. The corrective data 508a is applied to the reference color table 506a to generate customized color table 504a.

FIG. 5B illustrates system 510 in which the standard color table 502b is also the reference color table 506b. For example, the standard color table 502b is a stand-alone color table that can be applied for general applicability and provided on memory device 312. Corrective data 508b is provided, such as via a memory device on supply component, for example, on memory device 314. The corrective data 508b is applied to the standard color table 502b, such as via method 400, to transform the nodes of the standard color table 502b into the customized color table 504b.

FIG. 5C illustrates system 520 in which the reference color table 506c is transformed into both the standard color table 502c and the customized color table 504c. For example, the reference color table 506c is provided on memory device 312 as with standard residual values 512. The standard residual values 512 are applied to the reference color table 506c. In one example, a residual value of the standard residual values 512 is added to the value of the corresponding node in the reference color table 506c to provide a value at the corresponding node in the standard color table 502c. Thus, the standard residual value at location j of the standard residual values 512 is added to the value at node location j of the reference table 506c to provide the value at node location j of the standard color table 502c, in which j is the location from 1 to M. Corrective data 508c is provided, such as via a memory device on supply component, for example, on memory device 314. The corrective data 508c is also applied to the reference color table 506c, such as via method 400, to transform the nodes of the reference color table 506c into the customized color table 504c.

In some examples, the printing device 200 may include more than one transformations of a reference color table 320 to a customized table 328 based on a number of intended modifications to standard color tables. For example, the printing device 200 may include a supply component having additional corrective data to transform a reference color table to customized color tables corresponding with color saving mode that may differ from a standard mode or additional corrective data to transform a reference color table to a customized color table for a selected color gamut different than a standard color gamut. Other examples of transformations using corrective data located on supply components are contemplated. In these examples, system 300 may perform process 400 for each transformation. Additionally, system 300 may include one or more implementations of systems 500, 510, 520 for different transformations.

Figure 6:
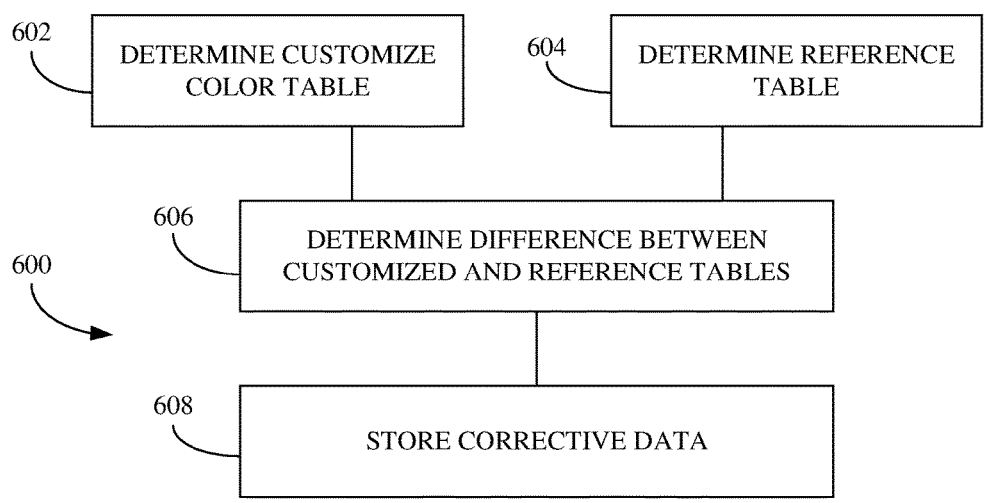
FIG. 6 is a block diagram illustrating an example method of generating corrective data for use with a reference color table of the example system of FIG. 3 and example method of FIG. 4.

FIG. 6 illustrates a method 600 for determining the residual values of the corrective data, such as the residual values of the corrective data 326. The corrective data 326 includes a plurality of residual values in which each residual value represents a difference of a value of a node of the intended customized color table and a value of a node of the reference color table 320. The nodes of the intended customized color table are determined at 602, and the nodes of the reference table are determined at 604. The intended customized color table will include the nodes of the customized color table that is generated with method 400. For example, the intended customized color table can be created for particular applications, supply component specifications, customer preferences, or other purposes. The reference color table can be a reference table associated with the printing device at issue, and can be a reference table of general applicability. Alternatively, the nodes reference table 320 specially created for the intended customized color table and loaded into the firmware of the printing device 200 to specifically correspond with the corrective data. The nodes of the intended customized color table and the nodes of the reference table can include nodes of predetermined values. In selecting the predetermined values of the nodes of the reference table 320, values of the predetermined values of the nodes of the reference table 320 close to the values of the customized color table 328 provides for efficient storage of the residual values.

The value of each node of the intended customized color table is subtracted from the value of the corresponding node in the reference color table 320 to provide a residual value corresponding with the node in the reference color table 320 at 606. Thus, the value at node location j of the intended customized color table is subtracted from the value at node location j of the reference color table 320 to provide the residual value corresponding with node location j of the reference color table, in which j is the node location from 1 to M. In an example in which the reference color table 320 is stored on the printing device 200 as a compressed data file, such as via a lossy compression, the reference color applied at 604 can include a decompressed, or reconstructed color table of the compressed reference color table stored on the printing device 200.

The residual values corresponding with the M nodes are stored as the corrective data on a memory device at 608. The corrective data can be stored as a bitstream, a set of values in a data structure such as an array or linked list, or other on memory device 100. The memory device can be included on a particular supply component. In one example, the corrective data can be stored on memory device 232 located on the ink cartridges 212 although other configurations are contemplated.

In one example, the corrective data can be stored on the memory devices 232 of the ink cartridges. The reference table 320 can be a multidimensional reference table 324. In this example, each color ink cartridge 212 can include a memory device 232 that stores the residue values corresponding with nodes of a multidimensional reference color table relevant to that color ink. For instance, the corrective data, or residual values, applicable to the cyan values of the multidimensional reference color table for each media type included in the corrective data can be included on the cyan color ink cartridge, the corrective data applicable to the magenta values of the multidimensional reference color table for each media type included in the corrective data can be included on the magenta color ink cartridge, and so on for the yellow and key color cartridges. The memory device for each cartridge can include corrective data for the corresponding cartridge color for one or more media types.

Figure 7:
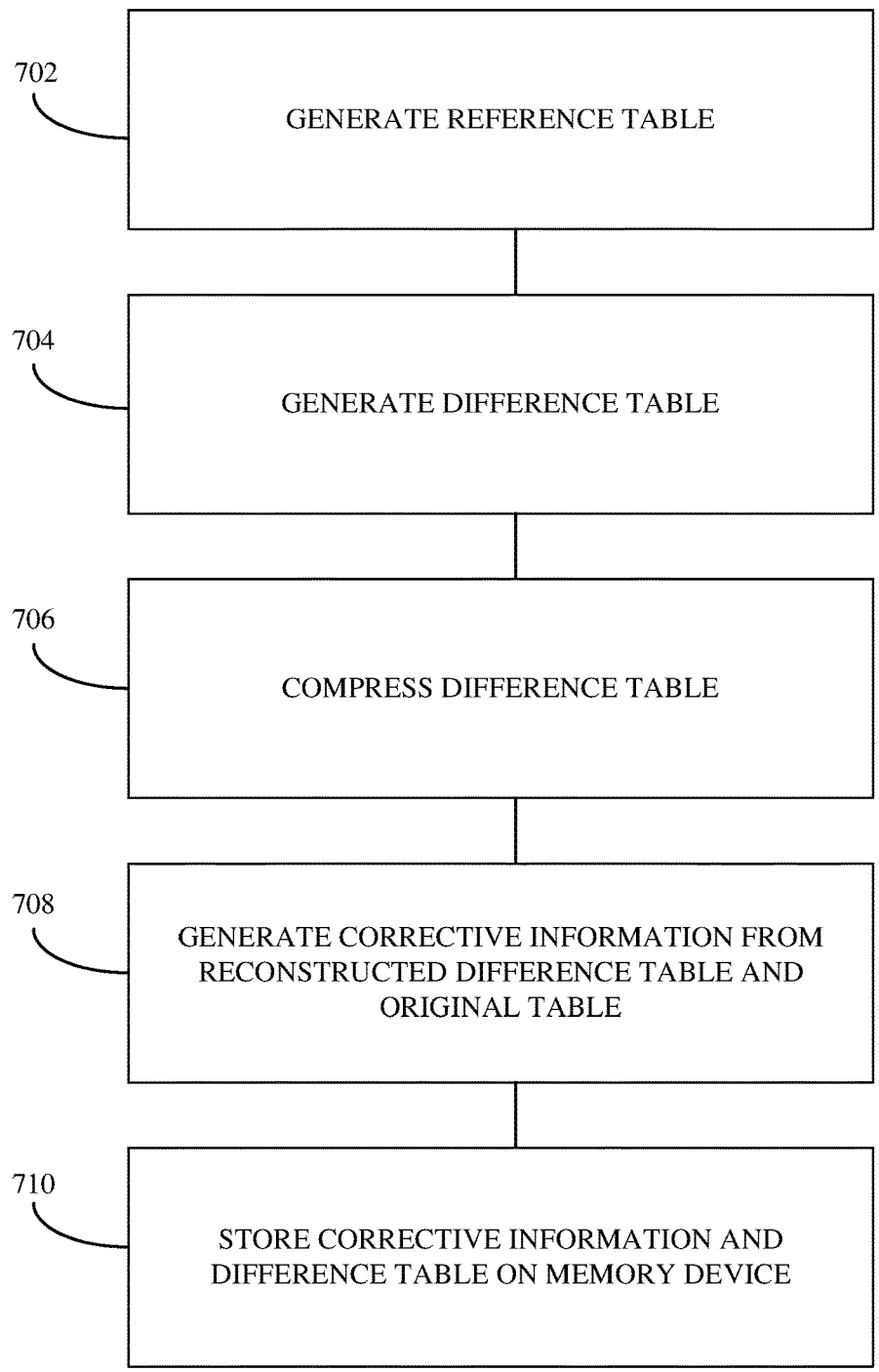
FIG. 7 is a block diagram illustrating another example method of generating corrective data and a reference table for use with the example system of FIG. 3 and example method of FIG. 4.

FIG. 7 illustrates an example method 700 of generating the corrective data 106 on memory device 100, which can include the compressed difference table and corrective information of memory device 100. The method 700 allows the storing one or more color look-up tables (CLUTs) on a memory device, such as flash memory on printer cartridges, is relatively expensive and limited. The method 700 supports lossy compression for relatively high compression ratios to meet storage space limitations and achieves relatively small color differences.

In one example, a printing device may employ a plurality of multidimensional color tables that correspond with different media types and neutral axes of a color gamut included in a color profile. In general, a profile can include N color tables to be processed, such as $CLUT_1$, $CLUT_2$, ..., $CLUT_N$, and the input color space includes $J_{in}$ channels. In one example, multiple color tables representing different rendering intents can be included with one ICC profile. Additionally, the output color space includes $J_{out}$ channels, and in many examples of an ICC profile $J_{in}$ and $J_{out}$ can be 3 or 4 channels. For each output channel, the corresponding lookup table contains $M^{J_{in}}$ nodes. For example, each color table can include $M^3$ nodes for each of the C, M, Y, and K four colorants corresponding with each ink color used in the printing device. Additionally, each type of media used in the printing device can include a set of color tables.

In the example method, a reference table $CLUT_{ref}$ is generated at 702. The reference table, which can correspond with reference color table 108, includes nodes having a preselected, or predetermined values. In one example, the reference table is generated from averaging the N color tables of the profile. The each of the N original color tables is subtracted from the reference table to obtain a corresponding difference color table difCLUT$_i$ at 704. For example, difCLUT$_i$=CLUT$_i$−CLUT$_{ref}$, i=1, 2, . . . , N. The N difference color tables are compressed, such as with a lossy compression, at 706. The compressed difference table is reconstructed and applied to the corresponding original difference color table to generate corrective information at 708. The compressed difference table and the corrective information are stored on a memory device at 710, such as on memory device 100 on supply component 102. The reference table can be stored on the printing device 200 where memory space can be more plentiful and contribute less to the overhead than on a supply component 102. In some examples, one or more of the compressed difference table, corrective information, and the reference table can be further compressed with a lossless compression.

The reference table CLUT$_{ref}$ in one example can be generated at 702 from averaging N original color tables, from the profile. For example, $$CLUT_{ref} = \frac{\sum_{i=1}^{N} CLUT_i}{N}$$

Each of the original color tables includes a plurality of nodes in which each node is at a location and includes a value. In one example, each of the multidimensional original color tables used to create the reference table can include $M^3$ nodes. The values of each node at node location j of each of the original color tables are added together and than divided by the number of values to provide a value at the corresponding node in the reference table. Thus, the value at node location j of each of the original color tables are added together, divided by the number of color tables N to provide the value at node location j of the reference color table, in which j is the node location from 1 to $M^3$.

The difference color table generated at 704 can include a plurality of difference nodes in which each node includes a value that represents a difference of a value of a node of the original color table and a value of a node of a reference table. In one example, the original color table and reference table each include $M^3$ nodes. The value of each node of the original color table is subtracted from the value of the corresponding node in the reference table to provide a value at the corresponding node in the difference table. Thus, the value at node location j of the original color table is subtracted from the value at node location j of the reference table to provide the value at node location j of the difference color table, in which j is the node location from 1 to $M^3$.

In one example of compressing a difference color table at 706, the nodes of the difference color table color table are transformed and processed to obtain quantized coefficients. The particular transformation and processing can be determined by a selected amount of compression, such as compression ratio, desired and can include a selected step size A. The quantized coefficients can be reordered into a one-dimensional bitstream using a multi-dimensional reordering, such as a three-dimensional zigzag ordering. The bitstream of quantized coefficients can be provided as a binary file and further compressed with a lossless compression. The resulting compressed bitstream can be stored as a file on the memory device 100 included as a compressed difference color table.

In the example of compressing the difference table at 706, a coefficient bit assignment table is calculated from the quantized coefficients. The coefficient bit assignment table can be applied to the quantized coefficients to reconstruct the coefficients in decompression. The three-dimensional zigzag ordering can introduce a large amount of redundancy to the coefficient bit assignment table, and the coefficient bit assignment table can be further compressed with the lossless compression. The compressed coefficient bit assignment table can be included as part of the compressed difference color table at 710 or stored separately with the firmware on printing device 200.

A coefficient bit assignment table can be created for each colorant. For a printing device using C, M, Y, K colorants, four separate coefficient bit assignment tables can be used. Additional parameters may dictate eight coefficient bit assignment tables can be used in a printing device, each coefficient bit assignment table corresponding with a different set of quantized coefficients of a compressed original color table.

A variety of lossy and lossless compression systems can be employed in method 700. In one example, the lossy compression applied at 706 can be implemented using a discrete cosine transform, or DCT, which expresses a finite sequence of data points in terms of a sum of cosine functions oscillating at different frequencies, although other systems can be employed. DCT compression can be particularly apt for examples in which color tables may be expressed in multiple dimensions. For example, an ICC profile may include a three-dimensional or a four-dimensional color table, and the lossy compression can be performed using a three-dimensional or four-dimensional DCT process, accordingly. Lossless compression can be implemented using a variety of lossless systems including Lempel-Ziv-Markov chain Algorithm process (or LZMA), GZIP (or GNU-zip) process, or other suitable lossless systems.

In order to determine the corrective information at 708, the compressed difference color table is reconstructed to generate an initially reconstructed difference color table. In one example, the value of each node of the reconstructed difference table is added to the value at the corresponding node in the reference table to provide a value at the corresponding node in the initially reconstructed table. The values of the nodes of initially reconstructed table are compared to the corresponding nodes in the corresponding original difference color table. The amount of difference between the values of initially reconstructed difference color table and the original difference color table can be referred to as an error, and may change for different amounts of compression.

An error threshold, such as a selected value, is defined for a difference between values in the nodes of the initially reconstructed difference color table and the values in the corresponding nodes of the original difference color table. For the set of nodes of the initially reconstructed difference color table having values outside the defined error threshold, corrective information is generated at 708.

For example, corrective information generated at 708 can include a residual value to be added to each node of the initially reconstructed difference table having a value outside of the error threshold to bring the value of that node within the error threshold, such as equal to the value of the corresponding node in the original difference color table, or within a more stringent error threshold, as well as the node location j corresponding with the residual value.

The nodes of the difference table, when compressed and reconstructed, can include a set of nodes that include a color difference falling outside of the error selected threshold at a selected amount of compression. Corrective information generated at 708 for the set of nodes can include a set of residual values to bring the nodes of the reconstructed difference color table equal to or within the error threshold or within a more stringent error threshold. Corrective information can also include the node locations corresponding with the residual values. In some examples, the corrective information is compressed with a lossless compression. Upon combination of the reconstructed difference color table and the reference color table, such as in printing device 200, the corrective information can be applied such as by adding the residual values to the nodes at the respective locations to obtain a reconstructed color table having all nodes within the error threshold.

In another example, the initially reconstructed difference table is combined with the reference table and subtracted from the original color table to determine which nodes are outside of the selected error threshold.

The example method 700 can be implemented to include a combination of one or more hardware devices and programs for controlling a system, such as a computing device having a processor and memory, to perform method 700 to compress a color table into a file or a bitstream. For example, method 700 can be implemented as a set of executable instructions stored in a computer memory device for controlling the processor to perform method 700.

Figure 8:
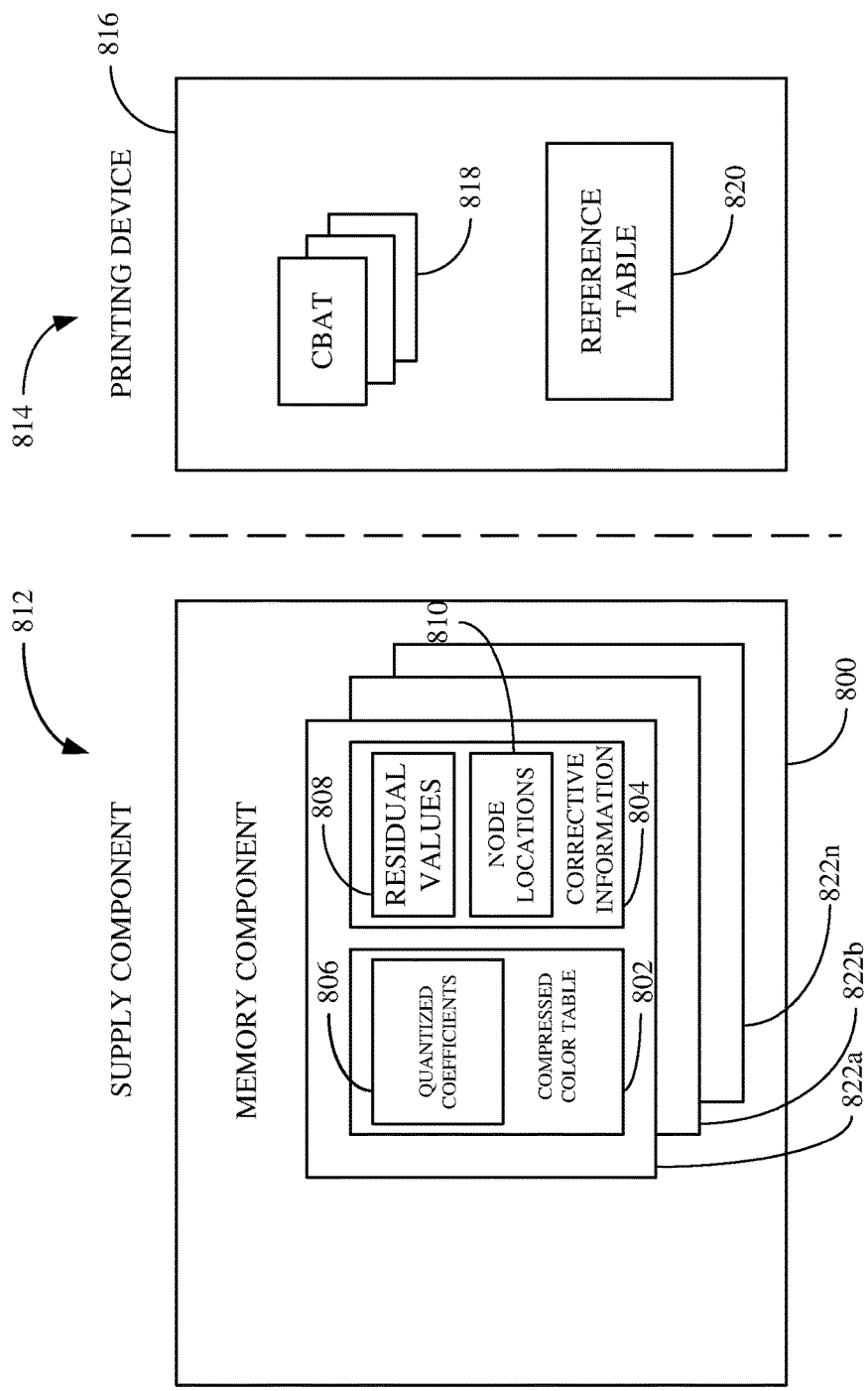
FIG. 8 is a block diagram illustrating an example memory device in accordance with the example memory device of FIG. 1.

FIG. 8 illustrates an example memory device 800 including a compressed difference color table 802 and corrective information 804, which can be included as part of corrective data 106 of memory device 100. In one example, the compressed difference color table 802 and corrective information 804 can be generated with method 700 and stored on the memory device 800 at 710. In another example, the compressed difference color table 802 and corrective information 804 are reproduced from another memory device that may have information stored at 710.

The compressed difference color table 802 stored on the memory device 800 includes bits representative of quantized coefficients 806 from a lossy compression of difference color table. The quantized coefficients 806 of compressed difference color table 802 can be produced at 706. In one example, the quantized coefficients 806 are stored as a binary file. In another example, the quantized coefficients 806 have been further compressed with a lossless compression. Memory device 800 can include addition information related to decoding the quantized coefficients, such as step size A or other information.

The corrective information 804 includes residual values 808 be added to a set of nodes of the initially reconstructed difference table to bring the value of that node within the error threshold. The residual values 808 can be produced at 708. The corrective information 804 can also include node location information 810 for the locations of the set of nodes to be modified with the residual values, such as node location information generated at 708, as to the location of the nodes corresponding with the residual values 808. In one example, the residual values 808 and node location information 810 are stored as a binary file. In another example, the residual values 808 and node location information 810 have been further compressed with a lossless compression.

In one example, the memory device 800 is included on a supply component 812, such as an ink cartridge. The supply component can be operably coupled to a printing device 814, which can correspond with printing device 200. The printing device 814 can include a separate memory device 816, which can correspond with memory 224. In one example, the separate memory device 816 includes a coefficient bit assignment table (CBAT) 818, such a coefficient bit assignment table generated at 706. The separate memory device 816 can also include a reference table 820 such as the reference table generated at 702, which can correspond with reference color table 108. In other examples, the CBAT 818 can be instead included on memory device 800.

The compressed difference table 802 and corrective information 804 can be included with one difference color table 822a of a plurality of difference color tables 822a, 822b, . . . , 822n. In one example, the color table information related to the ink color of the cartridge is included as a difference color table 822a. Other color difference color tables 822b-822n can include a color table for each media type/color separation method (such as K-Only and CMYK Black color separation methods). The plurality of difference color tables 822a-822n can relate to The N difference color tables, and each of the N difference color tables can include a unique set of quantized coefficients, residual values, and node location information. Further, the separate memory device 816 can include a plurality of CBATs that correspond with the quantized coefficients in each of the plurality of difference color tables 822a-822b for each of the colorants.

Figure 9:
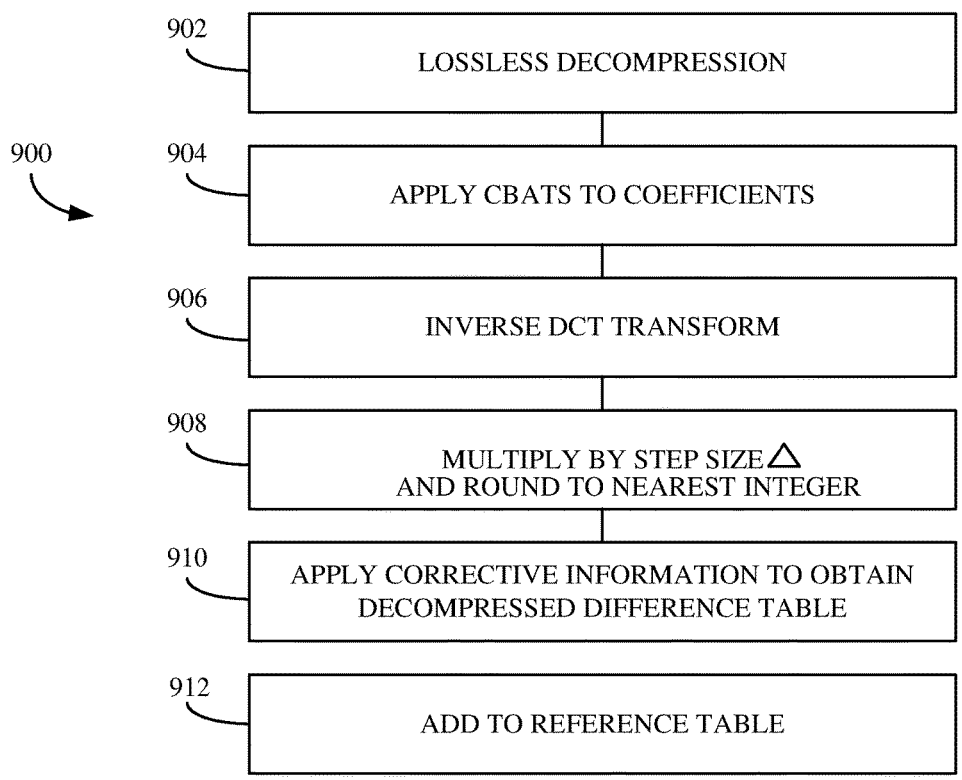
FIG. 9 is a block diagram illustrating an example method of applying the example memory device of FIG. 6 with a reference table generated with the example method of FIG. 7.

FIG. 9 illustrates a method 900 of decoding the compressed color difference table 822a of memory device 800. A standard lossless decompression technique, such as inverse LZMA or inverse GZIP (i.e., the inverse of the lossless compression applied at 406), is applied to losslessly compressed difference color table 802 and corrective information 804 at 902 to provide a binary stream including the quantized DCT coefficients, and corrective information such as residual values and nodes locations. The coefficient bit assignment table (CBAT) 818 can be used to determine how many bits of the binary stream belong to each node location. The coefficient bit assignment tables 818 are applied to the quantized DCT coefficients 806 to reconstruct the DCT coefficients at 904. An inverse DCT transform is applied to the DCT coefficients at 906. The coefficients are multiplied by the quantizer step size A and rounded to the nearest integer to obtain the initially reconstructed difference color tables at 908.

The corrective information 804 is applied to the initially reconstructed difference color tables at 910 to obtain the decompressed difference color table. In one example the corrective information 804 includes residual values 808 that can be applied to a set of nodes of the initially reconstructed color table to obtain the decompressed difference color table. For example, the residual value for an identified node location is added to the value of the corresponding node location in the initially reconstructed difference table. This process is repeated for each residue value in the corrective information 804.

The reference table 820 is added to the decompressed difference table from 910 to obtain final reconstructed color table at 912. In one example, the decompressed difference table and reference table 820 each include $M^3$ nodes, and the value of each node of the decompressed difference table is added to the value of the corresponding node in the reference table 620 to provide a value at the corresponding node in the final reconstructed color table. Thus, the value at node location j of the decompressed difference table is added to the value at node location j of the reference table 820 to provide the value at node location j of the final reconstructed color table, in which j is the node location from 1 to $M^3$. The final reconstructed $J_{in}$-dimensional to $J_{out}$-dimensional color tables can be applied to a color management system.

In one aspect, the present disclosure is directed to a print engine including a plurality of supply components, the print engine accepting a media type for printing, a reference color table including a set of nodes on a memory device, and corrective data including a set of residual values on a supply component, the corrective data to transform the set of nodes of the reference table to a customized color table for printing the media type. The reference color table can be located on a first memory device and the corrective data is located on a second memory device. The print engine can accept a plurality of media types for printing and the corrective data includes a plurality of sets of corrective data to transform the reference table to a plurality of customized color tables, wherein each set of the corrective data transforms the set of nodes of the reference table to one of plurality of customized color tables for one of the plurality of media types. the supply component can be an ink cartridge.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A supply component for a printing device, the supply component comprising:
    a reservoir storing a print material; and
    a memory device comprising:
        a plurality of corrective data to produce a corresponding plurality of color tables each customized for a respective media type of a plurality of media types, wherein a respective corrective data of the plurality of corrective data corresponds to nodes of a reference color table for the printing device that is able to accept the plurality of media types for printing, the respective corrective data comprising:
        a plurality of residual values to transform the nodes of the reference color table to a customized color table for use with a selected media type of the plurality of media types,
    wherein the respective corrective data is accessible by the printing device to transform the reference color table to the customized color table used for printing to a media of the selected media type.

2. The supply component of claim 1, wherein the respective corrective data comprises:
    quantized coefficients derived from a compression of a difference color table including a plurality of difference nodes in which each difference node represents a value that is to be combined with a corresponding node of the reference color table, the quantized coefficients useable to produce a reconstructed difference table, and
    the plurality of residual values to apply to the reconstructed difference table to produce an output difference color table combined with the reference color table to produce the customized color table for use with the selected media type of the plurality of media types.

3. The supply component of claim 2, wherein the respective corrective data includes node location information of locations of nodes of the reconstructed difference table to which the plurality of residual values are to be applied.

4. The supply component of claim 2, wherein the respective corrective data comprises a step size related to a compression ratio of the compression.

5. The supply component of claim 2, wherein the respective corrective data comprises a coefficient bit assignment table that includes information related to a number of bits assigned to each of the quantized coefficients.

6. The supply component of claim 2, wherein the compression is a lossy compression.

7. The supply component of claim 6, wherein the plurality of residual values are provided for nodes of the reconstructed difference table that have values that differ from values of corresponding nodes of the difference color table by greater than a specified threshold.

8. The supply component of claim 1, wherein the plurality of residual values comprise a bitstream of residual values.

9. The supply component of claim 1 wherein a subset of nodes of the reference color table corresponds to an ink color of a plurality of ink colors of the printing device.

10. The supply component of claim 1, wherein the respective corrective data in the memory device comprises losslessly compressed corrective data.

11. The supply component of claim 1, wherein the print material in the a reservoir comprises ink or toner.

12. The supply component of claim 1, wherein the plurality of media types comprise at least two selected from among plain paper, glossy paper, and an overhead transparency.

13. The supply component of claim 1, wherein the supply component is selected from among a drum, a developer, and a fuser.

14. The supply component of claim 1, wherein storage of the plurality of corrective data in the memory device consumes less memory space than storage of the plurality of color tables in the memory device.

15. A print cartridge for a printing device, the print cartridge comprising:
    a reservoir storing a print material; and
    a memory device comprising:
        a plurality of corrective data to produce a corresponding plurality of color tables each customized for a respective media type of a plurality of media types, wherein each respective corrective data of the plurality of corrective data corresponds to nodes of a reference color table for the printing device that is able to accept the plurality of media types for printing, each respective corrective data comprising:
        quantized coefficients derived from a compression of a respective difference color table including a plurality of difference nodes in which each difference node represents a value that is to be combined with a corresponding node of the reference color table, the quantized coefficients useable to produce a reconstructed difference table,
        a plurality of residual values to apply to the reconstructed difference table to produce an output difference color table combined with the reference color table to produce a customized color table for use with a selected media type of the plurality of media types, and
        node location information of locations of nodes of the reconstructed difference table to which the plurality of residual values are to be applied,
    wherein the respective corrective data is accessible by the printing device to transform the reference color table to the customized color table used for printing to a media of the selected media type.

16. The print cartridge of claim 15, wherein each respective corrective data of the plurality of corrective data comprises a step size related to a compression ratio of the compression.

17. The print cartridge of claim 15, wherein each respective corrective data of the plurality of corrective data comprises a coefficient bit assignment table that includes information related to a number of bits assigned to each of the quantized coefficients.

18. The print cartridge of claim 15, wherein the compression is a lossy compression, and the plurality of residual values are provided for nodes of the reconstructed difference table that have values that differ from values of corresponding nodes of the difference color table by greater than a specified threshold.

19. A supply component for a printing device, the supply component comprising:
 a reservoir storing a print material; and
 a memory device comprising:
  a plurality of corrective data to produce a corresponding plurality of color tables each customized for a respective media type of a plurality of media types, wherein a respective corrective data of the plurality of corrective data corresponds to nodes of a reference color table for the printing device that is able to accept the plurality of media types for printing, each respective corrective data comprising:
   quantized coefficients derived from a compression of a respective difference color table including a plurality of difference nodes in which each difference node represents a value that is to be combined with a corresponding node of the reference color table, the quantized coefficients useable to produce a reconstructed difference table,
   a plurality of residual values to apply to the reconstructed difference table to produce an output difference color table combined with the reference color table to produce a customized color table for use with a selected media type of the plurality of media types,
   node location information of locations of nodes of the reconstructed difference table to which the plurality of residual values are to be applied, and
   a step size related to a compression ratio of the compression, wherein the respective corrective data is accessible by the printing device to transform the reference color table to the customized color table used for printing to a media of the selected media type.

20. The supply component of claim 19, wherein the compression is a discrete cosine transform compression.

21. The supply component of claim 19, wherein the respective corrective data is accessible by the printing device to transform the reference color table to the customized color table used for printing to a media of the selected media type,
 the supply component further comprising a reservoir storing a print material.

* * * * *

UNITED STATES PATENT AND TRADEMARK OFFICE
CERTIFICATE OF CORRECTION

PATENT NO. : 10,356,285 B2
APPLICATION NO. : 15/702138
DATED : July 16, 2019
INVENTOR(S) : Mark Q. Shaw et al.

Page 1 of 1

It is certified that error appears in the above-identified patent and that said Letters Patent is hereby corrected as shown below:

In the Claims

In Column 16, Line 24, Claim 11, after "the" delete "a".

Signed and Sealed this
Twenty-second Day of October, 2019

Andrei Iancu
*Director of the United States Patent and Trademark Office*